(12) United States Patent
Nakajima et al.

(10) Patent No.: US 11,855,701 B2
(45) Date of Patent: Dec. 26, 2023

(54) WAVELENGTH CONVERSION APPARATUS

(71) Applicant: Nippon Telegraph and Telephone Corporation, Tokyo (JP)

(72) Inventors: Mitsumasa Nakajima, Musashino (JP); Shiori Konisho, Musashino (JP); Toshikazu Hashimoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 184 days.

(21) Appl. No.: 17/620,426

(22) PCT Filed: Jun. 25, 2019

(86) PCT No.: PCT/JP2019/025251
§ 371 (c)(1),
(2) Date: Dec. 17, 2021

(87) PCT Pub. No.: WO2020/261401
PCT Pub. Date: Dec. 30, 2020

(65) Prior Publication Data
US 2022/0360340 A1    Nov. 10, 2022

(51) Int. Cl.
*H04B 10/54* (2013.01)
*H04B 10/572* (2013.01)
*H04B 10/516* (2013.01)

(52) U.S. Cl.
CPC ......... *H04B 10/572* (2013.01); *H04B 10/516* (2013.01); *H04B 10/54* (2013.01)

(58) Field of Classification Search
CPC .... H04B 10/572; H04B 10/516; H04B 10/54; G06N 5/00; G06N 7/00; G06N 20/00
See application file for complete search history.

(56) References Cited

U.S. PATENT DOCUMENTS

| | | | |
|---|---|---|---|
| 10,755,188 B2* | 8/2020 | Ashrafi | G06N 3/084 |
| 11,731,273 B2* | 8/2023 | Cristache | B25J 9/1617 |
| | | | 700/250 |

(Continued)

OTHER PUBLICATIONS

L. Larger et al., *Photonic Information Processing Beyond Turing: An Optoelectronic Implementation of Reservoir Computing*, Optics Express, vol. 20, No. 3, 2012, pp. 3241-3249.

(Continued)

*Primary Examiner* — Tanya T Motsinger
(74) *Attorney, Agent, or Firm* — Workman Nydegger

(57) ABSTRACT

An optical transmission and reception system includes an optical transmitter including an optical modulator that optically modulates a transmission signal containing a known signal inserted at predetermined intervals and transmits it to an optical transmission line, and an optical receiver including an optical RC circuit that converts an optical modulation signal received from the optical transmission line into a complex time series signal, a photoelectric conversion element that converts the complex time series signal into an electrical intensity signal, and a digital signal processing unit that performs learning using the known signal as a teaching signal and performs demodulation, based on learning results, using the electrical intensity signal received from the photoelectric conversion element.

7 Claims, 12 Drawing Sheets

(56) References Cited

U.S. PATENT DOCUMENTS

| | | | |
|---|---|---|---|
| 2015/0341138 A1* | 11/2015 | Ishihara | H04J 3/14 398/35 |
| 2016/0211938 A1* | 7/2016 | Jiang | H04B 10/516 |
| 2017/0116515 A1 | 4/2017 | Abel et al. | |
| 2017/0265160 A1* | 9/2017 | Barton | H04W 64/006 |
| 2019/0182080 A1* | 6/2019 | Li | H04L 25/03235 |
| 2019/0222352 A1* | 7/2019 | Moon | H04B 10/616 |
| 2020/0260970 A1* | 8/2020 | Pickett | A61B 5/725 |
| 2021/0264242 A1* | 8/2021 | Canaday | G06N 3/063 |
| 2021/0406648 A1* | 12/2021 | Lathrop | G06N 3/08 |
| 2022/0099893 A1* | 3/2022 | Paudel | G02B 6/14 |
| 2022/0137485 A1* | 5/2022 | Konisho | G06E 3/00 359/107 |
| 2022/0360340 A1* | 11/2022 | Nakajima | H04B 10/572 |
| 2022/0385362 A1* | 12/2022 | Enhos | H04B 10/116 |
| 2023/0188394 A1* | 6/2023 | Ait Aoudia | H04L 27/2601 375/260 |

OTHER PUBLICATIONS

Mitsumasa Nakajima et al., *Coherently Driven Ultrafast Complex-Valued Photonic Reservoir Computing*, CLEO 2018, May 13, 2018, pp. 1-2.

\* cited by examiner

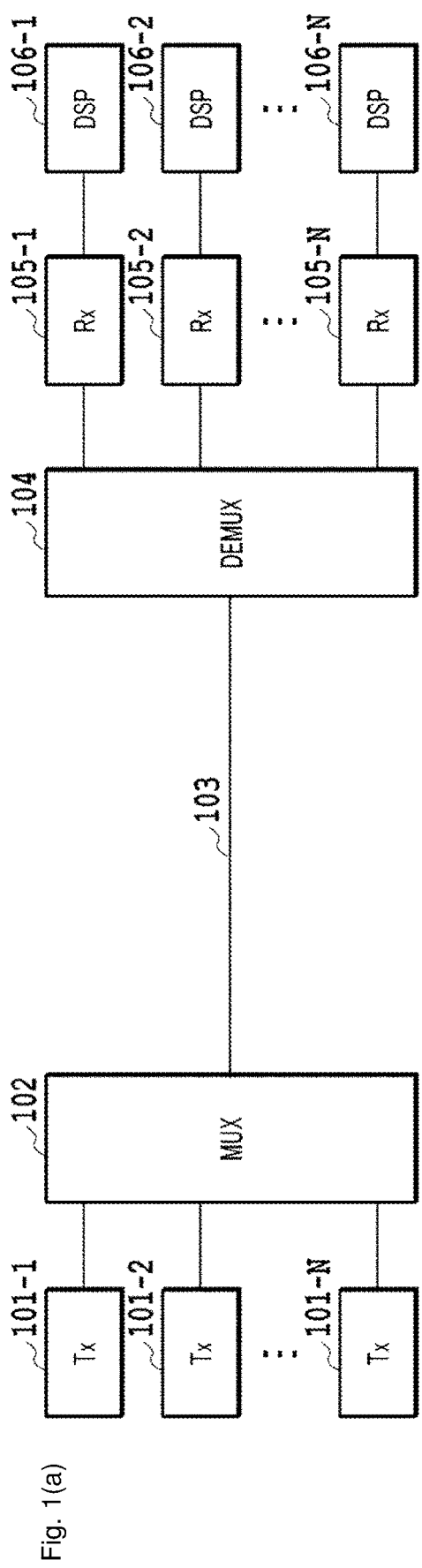
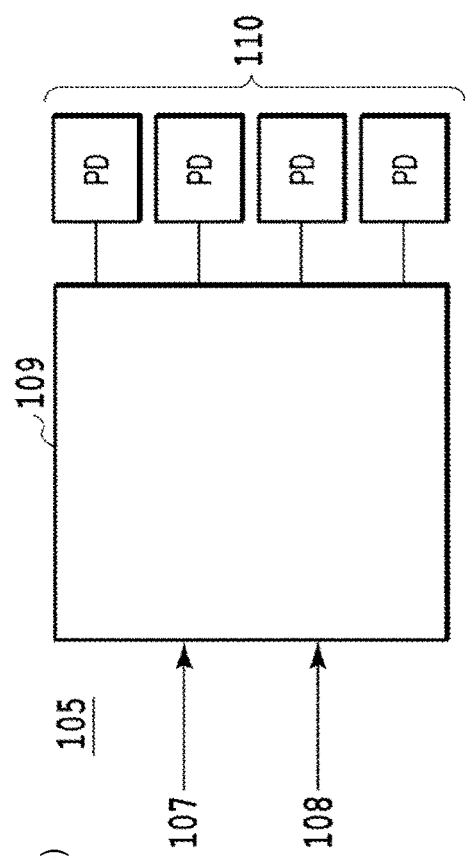
Fig. 1(a)
Fig. 1(b)

WAVELENGTH CONVERSION APPARATUS

TECHNICAL FIELD

The present invention relates to an optical transmission and reception system capable of demodulating multiple optical signals with a single optical receiver, in coherent optical communication, and particularly relates to an optical transmission and reception system capable of estimating multiple optical signals modulated in a complex space from the intensity waveform of a single optical receiver using optical reservoir computing.

BACKGROUND ART (Optical Coherent Communication)

With explosive increase in communication traffic due to the spread of smartphones and the Internet in recent years, further capacity enlargement is required in optical communication. In order to satisfy such requirements, in optical communication, attention is being paid to coherent optical transmission/reception technology based on wavelength/polarization/spatial multiplexing technology using the parallelism of light or multi-value modulation technology using a complex signal space.

FIG. 1 is a schematic diagram illustrating a conventional general wavelength division multiplexing (WDM) coherent optical communication system and its optical receiver. As illustrated in FIG. 1(a), in general WDM optical communication, on a transmission side, multiple I/Q optical modulators (Tx) 101-1 to N modulate multiple lights different in wavelength to obtain multiple optical modulation signals different in wavelength, and an optical MUX circuit 102 (for example, AWG or the like) combines the obtained multiple optical modulation signals and transmits the combined signal, as a wavelength division multiplexing (WDM) optical signal, to a reception side via an optical transmission line 103. It is also possible to combine modulation lights different in polarization state of light for each channel and transmit the combined light as a polarization multiplexed optical signal.

On the reception side, an optical DEMUX circuit 104 (for example, AWG or the like) demultiplexes the received WDM optical signal into optical signals of each wavelength or polarization state, and coherent optical receivers (Rx) 105-1 to N demodulate the demultiplexed optical signals. Further, digital signal processing devices (DSP) 106-1 to N perform distortion compensation and determination on the demodulated reception electric signals, for each wavelength channel.

FIG. 1(b) illustrates one general configuration of the coherent optical receiver 105. For reproduction, the coherent optical receiver 105 causes an input optical signal 107 modulated in the complex signal space to interfere with a laser beam 108 from a local laser source. For this purpose, a high-precision light interference system 109 called a 90° hybrid, the local laser source 108 with narrow line width and high stability, and four photoelectric conversion elements (photodiode: PD), which are combined as a balanced PD 110, are required. For the above reason, the coherent optical receiver is complicated in device configuration, compared to an optical receiver of direct photodetection using light intensity modulation.

In addition, for the distortion compensation and determination in the complex signal space of reception electric signals in respective channels, the digital signal processing devices (DSP) 106-1 to N are required for each wavelength channel or polarization channel, which further complicates the configuration.

(Optical Reservoir Computing)

In recent years, on the other hand, machine learning using a neural network (NN), which models information processing in the brain, has been gaining attentions from various fields. The NN is a large-scale non-linear network in which numerous neurons with non-linear response are connected by synapses. Especially, deep learning by a hierarchical NN including neurons disposed in multiple layers is beginning to be widely applied.

In general, in order to handle time series data in the NN, a recursive network structure capable of referring to past information is required. Such an NN is called a recurrent neural network (RNN), in which a network configuration having a feedback connection between layers of a hierarchical NN is generally used. The RNN is widely applied to learning/processing on time series data, such as voice recognition and sensing data. However, the connections of synapses increase explosively according to an increase in the number of layers and the number of neurons, and therefore taking time in calculation is the disadvantage of this network.

In recent years, as a method for solving the above-described problem, a computing technique called reservoir computing (RC) that models information processing in the cerebellum has been proposed (see the following Non-Patent Literatures 1 and 2).

FIG. 2 illustrates a general form of a circuit (RC circuit) for executing reservoir computing. The RC circuit 10 includes an input layer 11 in which an input signal u(n) is connected to respective neurons, an intermediate layer (reservoir layer) 12 in which respective neurons are connected to each other, and an output layer 13 in which signals of respective neurons are summed up to output an output signal y(n). The output signal y(n) from the RC in response to the input signal u(n) can be determined by the following expressions (1) and (2).

$$x_i(n) = f\{\Omega_{ij}x_i(n-1) + m_i u(n-1)\} \quad (1)$$

$$y(n) = \sum_{i}^{N} \omega_i x_i(n) \quad (2)$$

In the above expressions, N represents the number of neurons, $x_i(n)$ represents the state of the i-th neuron at time step n, and $\Omega_{ij}$, mi, ηi, and ωi represent weighting coefficients representing the mutual connection between neurons, the connection of the input signal to the neuron, the connection of FB signal from the output to each neuron, and the connection from each neuron to the output. Further, the mathematical function f(•) represents a non-linear response in each neuron, and tan h(•) (hyperbolic tangential function) or the like is frequently used.

The major difference between RC and a general recurrent neural network (RNN) is that the networks of the input layer 11 and the intermediate layer 12 are fixed and the variable used for learning is limited only to the weighting coefficient ωi of the output layer 13. Since this system can greatly reduce the variables to be learned, it has a great advantage over time series learning in which data is enormous and high-speed processing is required.

An optical reservoir computing circuit (optical RC circuit) has attracted attentions because a simple implementation configuration using time delay due to an optical loop has been reported, as exemplarily illustrated in FIG. 3. In the exemplary implementation configuration of the optical RC circuit illustrated in FIG. 3, a laser beam emitted from a laser source 211 is modulated by an optical modulator 212, and then input via an optical transmission line 210 and an optical FIR filter unit 213 from an optical coupler 214 into an optical circulating portion 215. The optical circulating portion 215 is an optical loop (optical delay line, delay optical ring) provided with a variable attenuator 216 and a non-linear element NL 217.

A part of the circulating optical signal is branched and output by an optical coupler 218, and the rest of the light continuously circulates in the optical circulating portion 215 while passing the non-linear element NL 217 and the variable attenuator 216. The branched light from the optical coupler 218 is converted into an intermediate signal x(t) of an electric signal by an optical receiver 219. An electric signal processing circuit 220 performs calculation of expression (2) on the intermediate signal x(t) output from the optical receiver 219. Thus, this configuration is capable of serving as the optical reservoir computing circuit (optical RC circuit).

According to this system, the non-linear element NL 217 having the time delay is used to divide the loop within the delay time at predetermined intervals, and a virtual network is configured by regarding the instantaneous light intensity of each point on the delay line as a virtual node state of the network. Accordingly, unlike other optical NN, this system is advantageous in that it does not require performing optical wiring to numerous non-linear elements and in that the optical RC circuit network can be implemented only with a single optical delay line and a non-linear element.

CITATION LIST

Non-Patent Literature

Non-Patent Literature 1: L. Larger, et al., "Photonic information processing beyond Turing: an optoelectronic implementation of reservoir computing", 2012 Jan. 30, Vol. 20, No. 3, Opt. Express 20, 3241
Non-Patent Literature 2: M. Nakajima et al., "Coherently Driven Ultrafast Complex-Valued Photonic Reservoir Computing", CLEO 2018.OSA, SM1C.4.

SUMMARY OF INVENTION

Technical Problem

An object of the present invention is to realize an optical transmission and reception system that reproduces an optical complex signal from a reception light intensity waveform of optical coherent communication and especially uses direct photodetection by a single photoelectric conversion element (PD) and an optical RC circuit to reproduce optical signals in a complex space transmitted from multiple optical transmitters from the intensity waveform of a reception optical signal of the single PD.

Means for Solving the Problem

In order to attain the object, one example of an embodiment of the present invention is characterized by including the following configurations.

(Configuration 1)
An optical transmission and reception system characterized by including
an optical transmitter that includes a known signal insertion unit that inserts a known signal into a transmission signal at predetermined intervals, and an optical modulator that optically modulates the transmission signal into which the known signal has been inserted and transmits an optical modulation signal to an optical transmission line, and
an optical receiver that includes
an optical RC circuit that converts the optical modulation signal received from the optical transmission line into a complex time series signal,
a photoelectric conversion element that converts the complex time series signal into an electrical intensity signal, and
a digital signal processing unit that performs learning using the known signal as a teaching signal and performs demodulation, based on learning results, using the electrical intensity signal received from the photoelectric conversion element.

(Configuration 2)
An optical transmission and reception system according to configuration 1, which is characterized in that the optical transmitter or the optical receiver is provided with a random signal generation unit that adds a random signal at a period equal to or higher than a bit rate of the transmission signal, the optical RC circuit includes a non-linear conversion unit and a delay line connected to the non-linear conversion unit, and the non-linear conversion unit performs non-linear conversion using a signal on which the random signal is superposed and a signal received from the delay line and optically outputs the complex time series signal.

(Configuration 3)
An optical transmission and reception system according to configuration 1 or 2, which is characterized in that the optical modulation signal is an optical modulation signal obtained by, prior to output, combining optical signals with different wavelengths or polarizations output from one or more transmitters for each channel in an optical MUX circuit.

(Configuration 4)
An optical transmission and reception system according to configuration 1, which is characterized in that the optical RC circuit includes a delay optical ring provided with a non-linear element and an optical coupler, and an optical modulator provided in a front stage of the delay optical ring to modulate an input optical signal received from the optical transmission line by a random signal generated by an arbitrary waveform generator and output the modulated optical signal to the non-linear element, and the complex time series signal is branched and output from the optical coupler to the photoelectric conversion element.

(Configuration 5)
An optical transmission and reception system according to configuration 1, which is characterized in that the optical modulator of the optical transmitter generates the optical modulation signal by an output of the digital signal processing unit that multiplies the transmission signal by a random signal, the optical RC circuit includes a delay optical ring provided with a non-linear element and an optical coupler, an input optical signal received from the optical transmission line is input to the non-linear element, and the complex time series signal is branched and output from the optical coupler to the photoelectric conversion element.

(Configuration 6)

An optical transmission and reception system according to configuration 1, which is characterized in that the optical RC circuit includes a delay optical ring provided with a photoelectric conversion element and an optical modulator to which an electric output of the photoelectric conversion element is input, the electric output of the photoelectric conversion element is electrically branched and output to the digital signal processing unit, and a random signal from an arbitrary waveform generation device is input to the optical modulator provided in the delay optical ring.

Effects of Invention

The above-described optical transmission and reception system realizes an optical transmission and reception system using an optical RC circuit to reproduce an optical complex signal from a reception light intensity waveform of optical coherent communication. In particular, the present invention can realize an optical transmission and reception system that uses direct photodetection by a single PD and an optical RC circuit to reproduce optical signals in a complex space transmitted from multiple optical transmitters from an intensity waveform of a reception optical signal of the single PD.

BRIEF DESCRIPTION OF DRAWINGS

FIG. 1a is a diagram illustrating a conventional general wavelength division multiplexing (WDM) coherent optical communication system, and FIG. 1(b) is a diagram schematically illustrating an optical receiver thereof.

DESCRIPTION OF EMBODIMENTS

Hereinafter, embodiments of the present invention will be described in detail with reference to the attached drawings.

The optical transmission and reception system according to an embodiment of the present invention uses a known signal as a teaching signal to perform learning for demodulation and signal estimation, on the reception side thereof, by using a reservoir computing optical circuit (optical RC circuit), which is a kind of neural network. Therefore, in the front stage of the I/Q optical modulator of the transmission side, a known signal insertion unit is provided that inserts the known signal (training signal) into a transmission signal at predetermined intervals, so that a modulation signal into which the known signal has been inserted is transmitted. A digital signal processing unit on the reception side uses this known signal as a teaching signal to perform learning in the neural network, demodulates reception signal based on learning results, and estimates the transmission signal.

Further, in the present invention, one signal (symbol) is divided into plural parts in the time direction and a random signal (random number) is superposed. Then, reservoir computing (RC), which is a kind of recurrent neural network (RNN), performs learning so as to correctly demodulate divided signals. Such a division can simulate the connection between the input layer and the intermediate layer in the neural network. In order to obtain an effective degree of accuracy, it is desired to divide one symbol into four parts.

Example 1 of Embodiment 1

An optical transmission and reception system of Example 1 of Embodiment 1 of the present invention will be described with reference to FIG. 4. In the present embodiment, provided is a method for receiving and estimating a complex optical signal from a single coherent optical transmitter from the light intensity waveform of a single photoelectric conversion element (PD).

Figure 2:
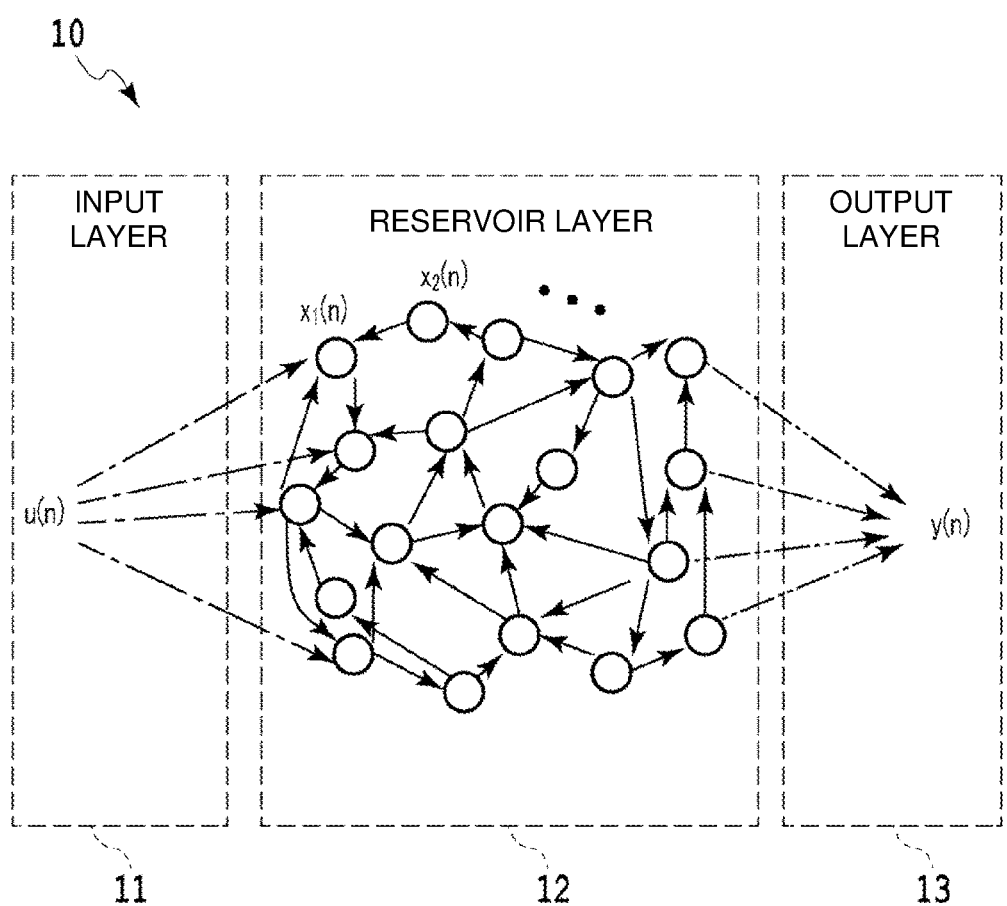
FIG. 2 is a diagram illustrating a general form of an optical circuit (RC circuit) for executing conventional reservoir computing.
Figure 3:
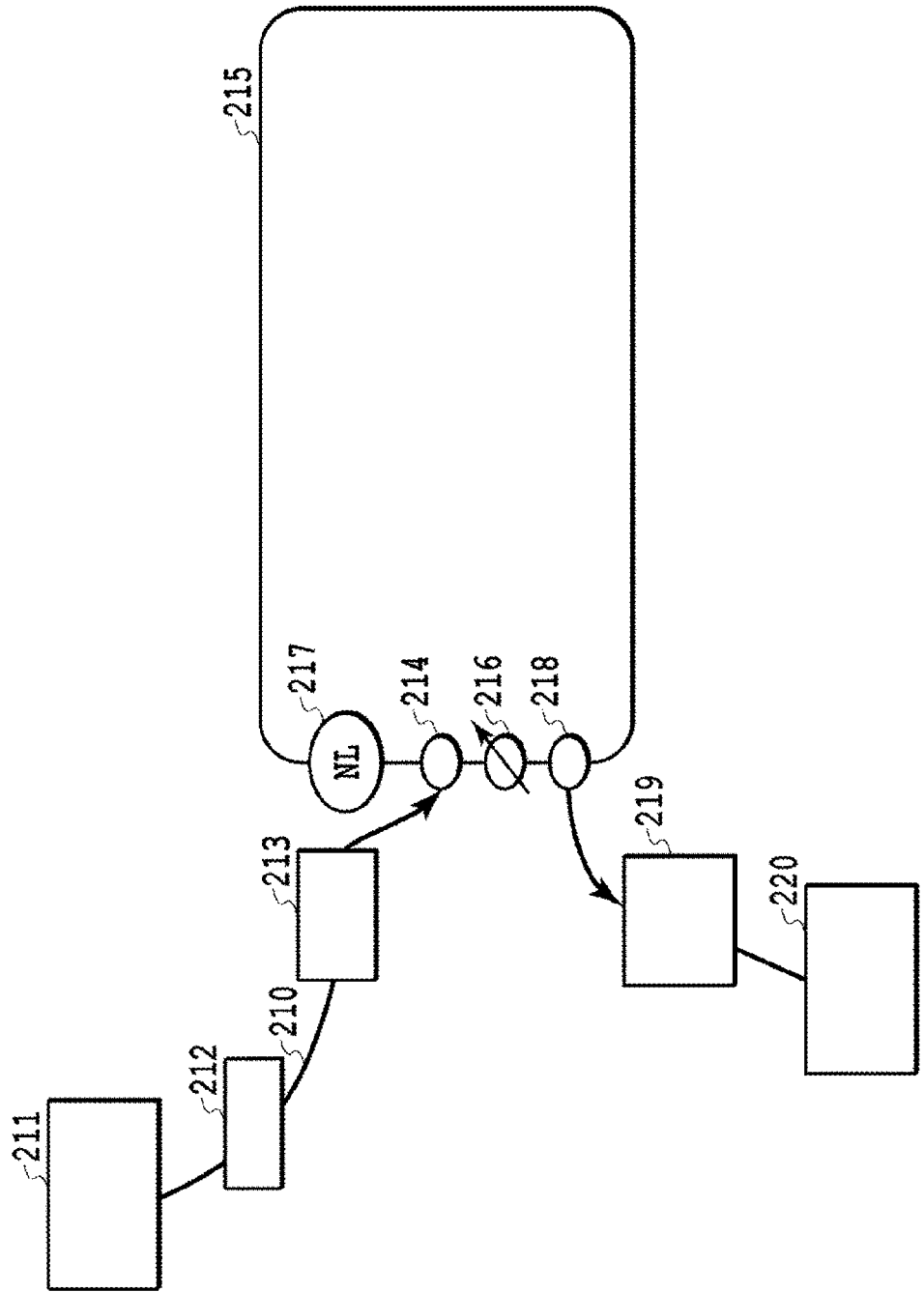
FIG. 3 is a diagram illustrating an exemplary implementation configuration of a RC circuit using conventional time delay.
Figure 4:
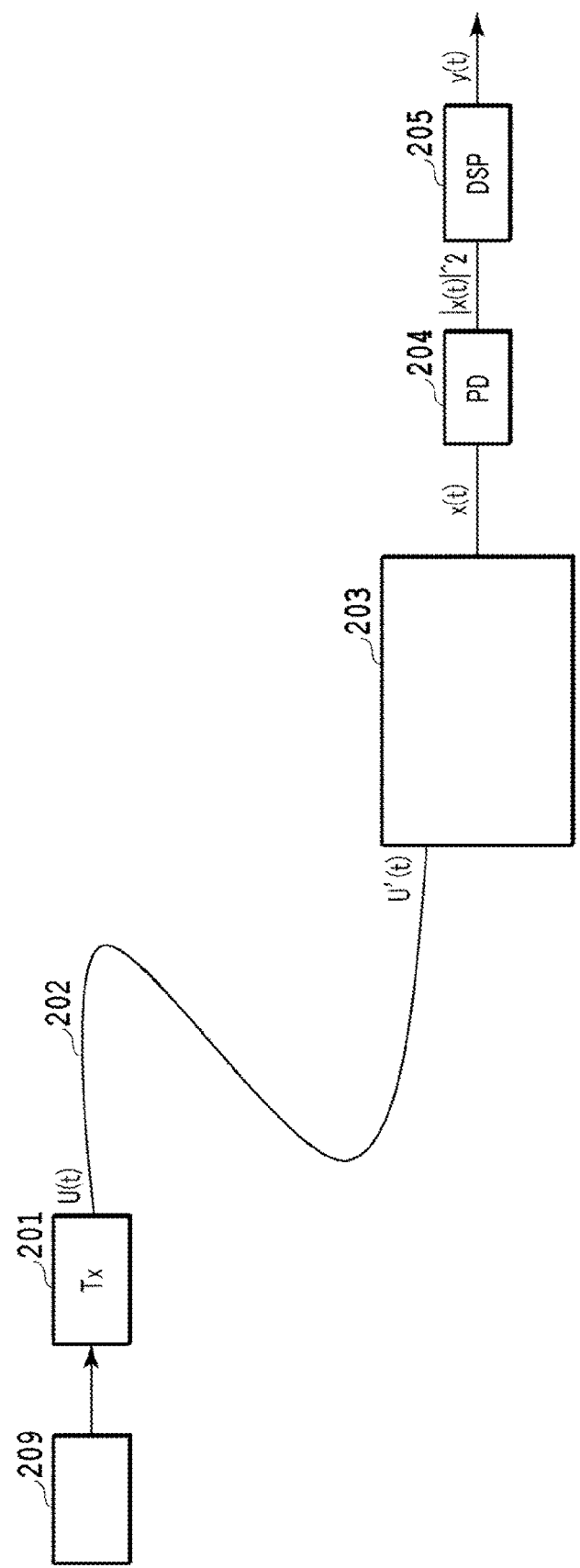
FIG. 4 is a diagram explaining an optical transmission and reception system of Example 1 of Embodiment 1 of the present invention.

In FIG. 4, an I/Q optical modulator 201 modulates a transmission signal containing a known signal (training signal) inserted at predetermined intervals by a known signal insertion unit 209 on the transmission side. The modulated signal is transmitted via an optical transmission line 202, as a single-wavelength light transmission signal u(t), to the reception side. On the reception side, a received optical signal u'(t) is subjected to conversion corresponding to the following expression (1), via an optical RC circuit 203, and is converted into a complex time series signal x(t). The complex time series signal x(t) is square-law detected by a photoelectric conversion element (PD) 204, and therefore is subjected to conversion of the following expression (3) and becomes an electrical intensity signal x'(t).

$$x'(t)=|x(t)|^2 \qquad (3)$$

The electrical intensity signal is subjected to analog-to-digital conversion (ADC) in a digital signal processing device (DSP) 205. For demodulation and reproduction, the DSP 205 performs calculation of expression (2) to estimate a desired complex transmission waveform, as an output signal y(t). In expression (2), ωi is a complex number. For the optical RC circuit 203, for example, the configuration disclosed in Non-Patent Literature 1 including a delay ring and a single non-linear element can be used.

The DSP 205 performs learning using the above-mentioned known signal part as a teaching signal, and demodulates the transmission signal based on learning results.

Example 2 of Embodiment 1

Figure 5:
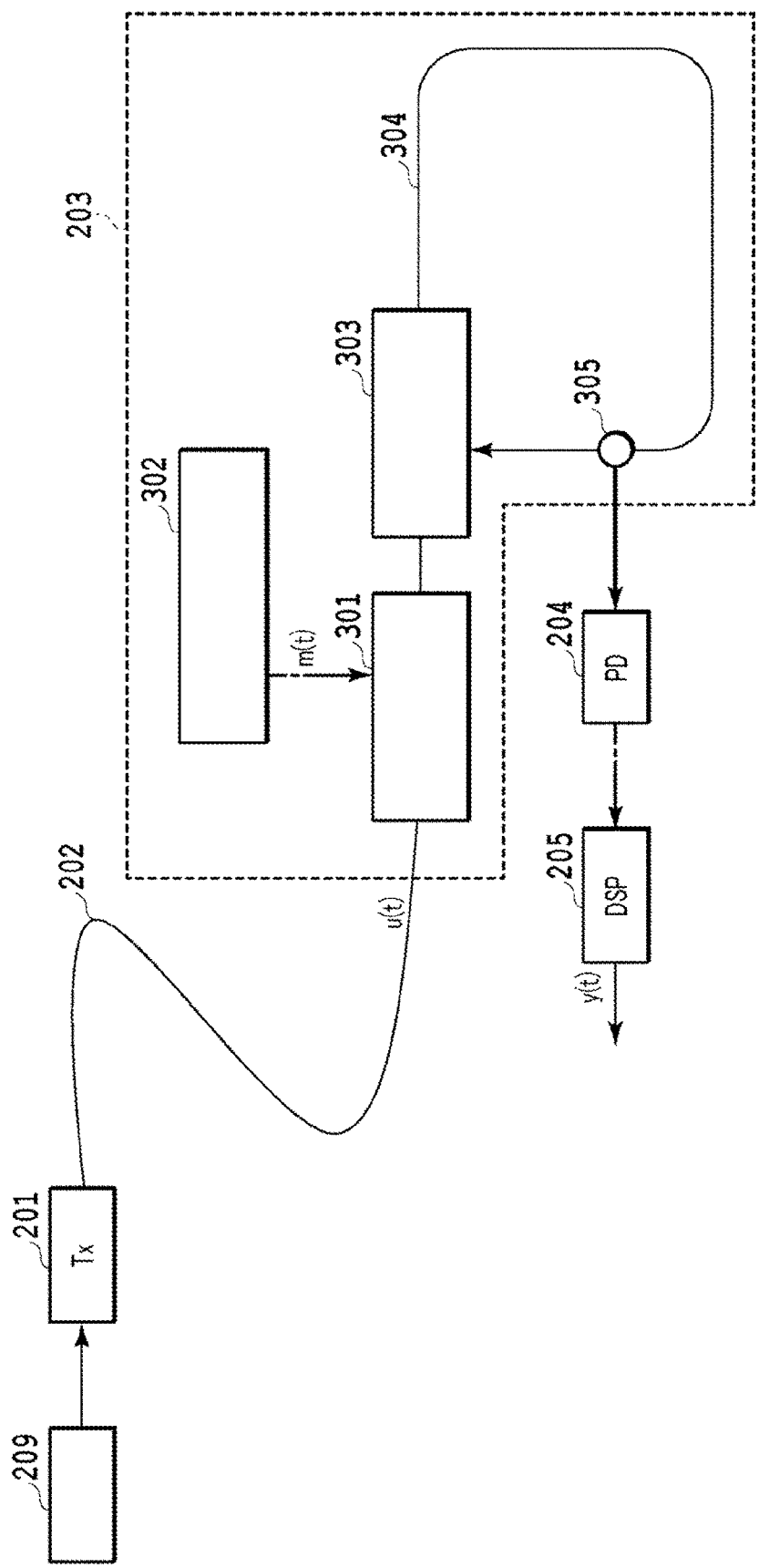
FIG. 5 is a diagram explaining an optical transmission and reception system of Example 2 of Embodiment 1 of the present invention.

FIG. 5 illustrates, as Example 2 of Embodiment 1, an exemplary form of the optical RC circuit 203. Descriptions of constituent elements will be omitted when they have the same reference numbers as those in Example 1 of FIG. 4. In the configuration of Example 2, an optical modulator 301 provided in the front stage of a delay optical ring 304 of the optical RC circuit 203 multiplies a random number signal (random signal) m(t) generated by an arbitrary waveform generator 302 with a received input optical signal u(t). The multiplied signal is input to a non-linear element 303 of the delay optical ring 304 and subjected to non-linear conversion.

For example, a semiconductor optical amplifier, a super-saturated light absorber, or an optical-electrical-optical (OEO) converter can be used as the non-linear element. The optical signal having passed through the non-linear element 303 is introduced into the non-linear element 303 again via the delay optical ring 304 having a delay length D and circulates continuously. The evolution equation of the signal x(t) in the delay optical ring 304 at this time is defined by the following expression (4).

$$dx(t)/dt = f\{\gamma x(t-D) + m(t)u(t)\} \quad (4)$$

Here, γ represents a constant deriving from the branching ratio of the coupler. θ represents the sampling interval between the random number signal m(t) and the receiver. T represents the length of a transmitted symbol. Further, for simplification, D is set to be equal to T1 (D=$T_1$). When x(t) is described by the time discretized using the sampling time T1, the following expression (5) is obtained.

$$x_i(n) = f\{\alpha x_i(n-1) + \pm m_i u(n-1)\} \quad (5)$$

However, n represents the time step of a discretized signal. The suffix i is used to express the i-th response of a signal obtained when signal in the symbol time T is further divided by the sampling interval θ. From the above-described relationship, i takes the range of [1:N]. From the comparison with the expression (1), the dynamics of expression (5) corresponds to dynamics of reservoir computing in a diagonal matrix in which all the elements of a coupling matrix Ωij are α and when the number of neurons is N. Although T is set to be equal to D (T=D) for simplification, Ωij can be changed by adjusting the length of the delay ring. For example, setting a relationship of D=T−θ can convert the diagonal matrix into a ring matrix.

Similar to Example 1, the complex time series signal x(t) branched and output from an optical coupler 305 provided in the delay optical ring 304 is converted into an electrical intensity signal x'(t) by the PD 204 and demodulated and output by the DSP 205. The DSP 205 performs learning using the known signal inserted on the transmission side, as a teaching signal, and demodulates the transmission signal based on learning results.

Preferably, in order to prevent excessive attenuation and oscillation of signal power, the random number signal m(t) is generated in the section of [0:1]. Further, the random number signal may be a complex number so that a phase term φ(t) is given as m(t)=|m(t)|exp(jφ(t)). In that case, in consideration of phase repeatability, φ(t) is generated in the section of [0:2π]. In the generation of the random number, for example, a pseudo random number generation algorithm such as a general linear congruential method is used. The random number value may not be uniform, and it may be possible to generate a biased random number distribution by the Box-Muller method or the like.

Example 3 of Embodiment 1

Figure 6:
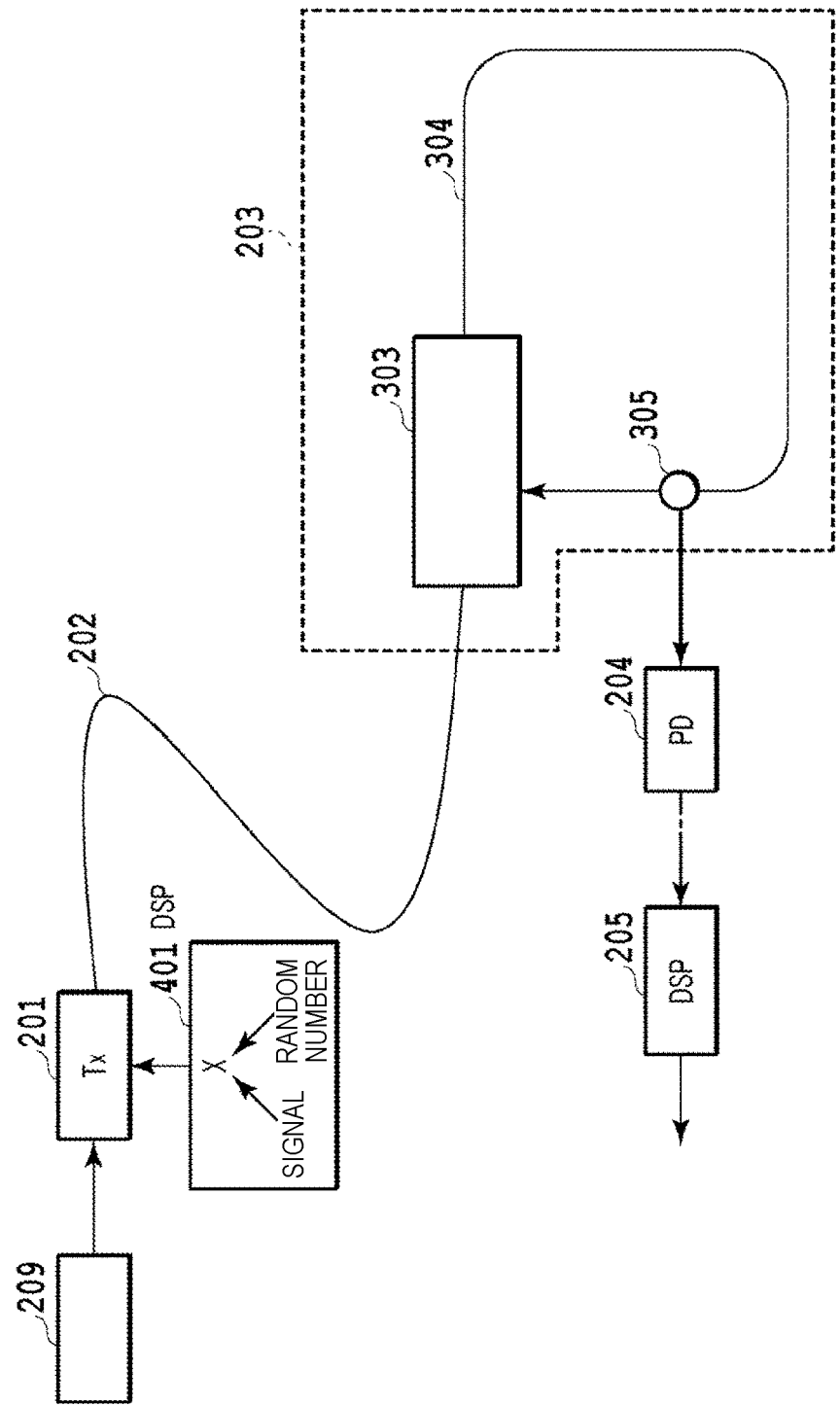
FIG. 6 is a diagram explaining an optical transmission and reception system of Example 3 of Embodiment 1 of the present invention.

FIG. 6 illustrates, as Example 3, another configuration of Embodiment 1.

In the above-described configuration of Example 2 of Embodiment 1 illustrated in FIG. 5, the arbitrary waveform generator 302 and the optical modulator 301 are provided in the optical RC circuit 203 on the reception side, so as to generate a mask function (random signal) m(t) and modulate and multiply it. On the other hand, the configuration of the Example 3 of Embodiment 1 illustrated in FIG. 6 includes a DSP 401 installed on the transmitter side. Therefore, m(t)u(t) can be calculated in advance in the digital region and can be transmitted later. This configuration brings excellent effects to the receiving unit in that the arbitrary waveform generation device 302 and the optical modulator 301 become unnecessary. Descriptions of constituent elements will be omitted when they have the same reference numbers as those in other examples.

Example 4 of Embodiment 1

Figure 7:
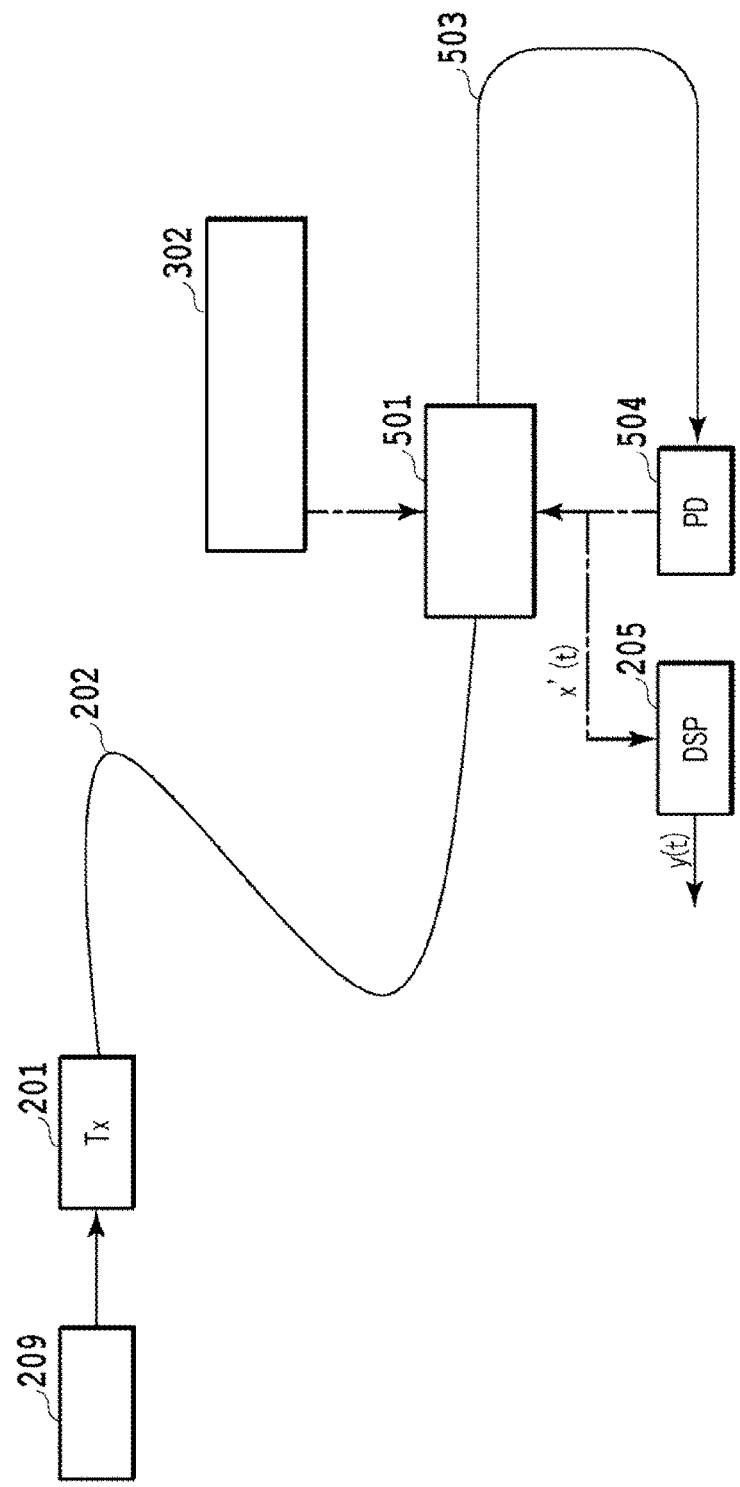
FIG. 7 is a diagram explaining an optical transmission and reception system of Example 4 of Embodiment 1 of the present invention.

Further, like a configuration of Example 4 of Embodiment 1 illustrated in FIG. 7, a part of a delay optical ring 503 on the reception side may be provided with a PD 504 and an optical modulator 501 to which an output of the PD 504 is input, so as to be used as a non-linear element. In this case, the section between the PD 504 of the delay optical ring 503 and the optical modulator 501 serves as an electric signal path. The electric output of the PD 504 is electrically branched and output to the DSP 205. A random signal from the arbitrary waveform generation device 302 is also input to the optical modulator 501.

Configuring as described above can integrate the optical RC circuit with the optical receiver. In addition, the optical modulator for generating the mask function m(t) and the non-linear element can be shared. However, the mask function m(t) may by calculated on the transmission side, like the DSP 401 of FIG. 6.

From the above-described output intensity signal x'(t), the DSP 205 obtains a complex output y(t) by multiplying the complex weight ωi. A general linear regression method is applicable when determining ωi. For example, an algorithm such as Tiknov regularization can be used in comparison with desired transmission signal data and in determination. Further, for example, using the Least Mean Square (LSM) method or the like can realize adaptive changing even when the optimum solution of ωi fluctuates in time series. The effects of the present invention can be obtained regardless of the algorithm of learning, which does not limit the scope of the present invention.

In general, normal direct photodetection loses phase information, and therefore it is impossible to compensate for inter-symbol interference caused by wavelength dispersion or the like. However, using phase information of the output intensity signal x'(t) demodulated in this system can reproduce information of the complex space. Accordingly, it is possible to compensate for the inter-symbol interference in the digital region after the above-mentioned phase demodulation. Descriptions of constituent elements will be omitted when they have the same reference numbers as those in other examples.

(Simulation Results of Embodiment 1)

Figure 8:
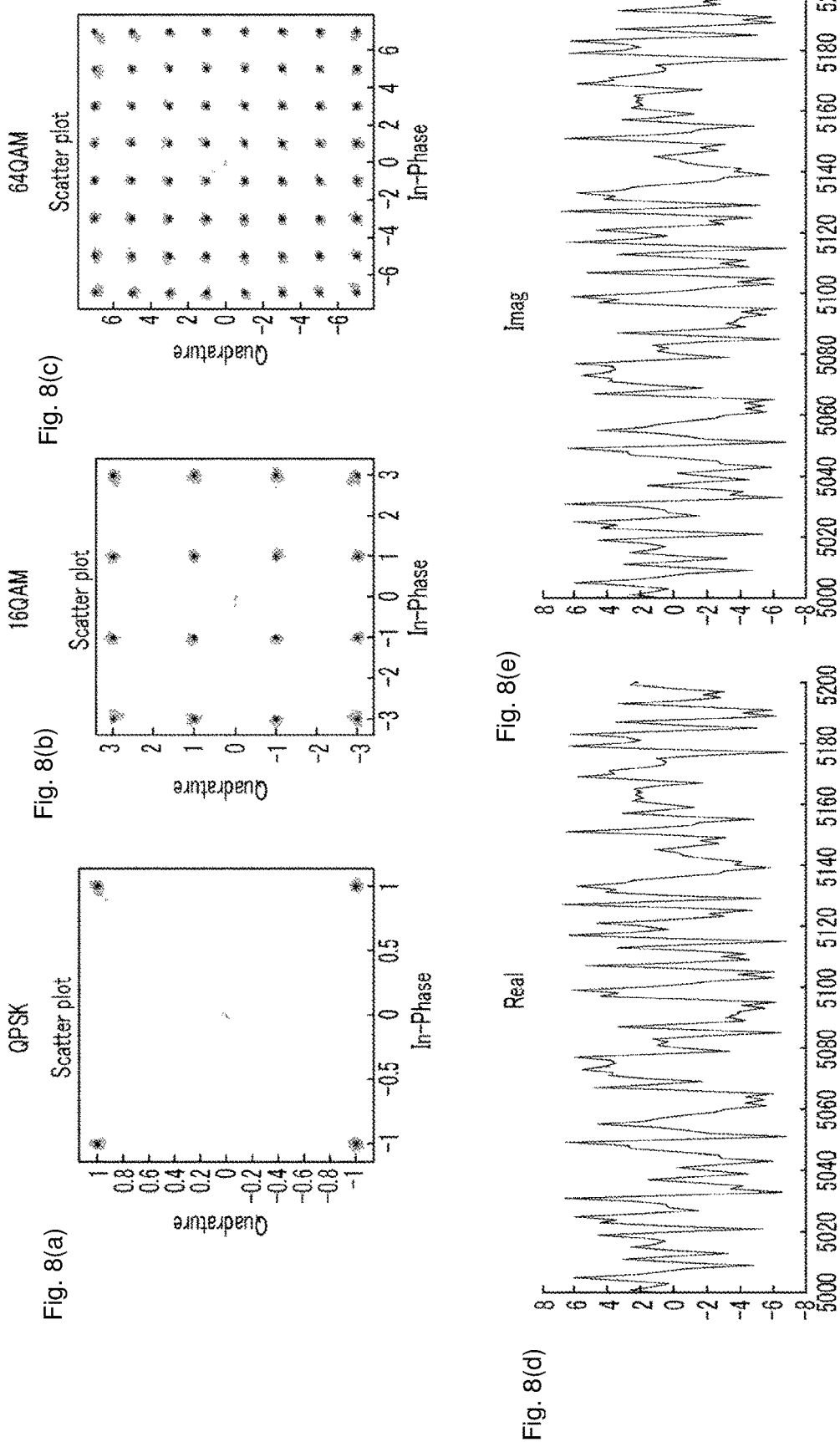
FIG. 8 is a diagram illustrating simulation results of coherent demodulation in Embodiment 1 of the present invention.

FIG. 8 illustrates, as an example of learning, simulation results obtained when three types of optical modulation signals of 4QPSK, 16QAM, and 64QAM are subjected to complex reception estimation according to the method proposed in Embodiment 1 of the present invention. Calculation of the simulation is performed in the baseband width, while ignoring influences of band constriction and group delay in the transmission path caused by the optical filter. The following expression (6) is for calculating the optical RC circuit considering the configuration of FIG. 7.

$$dx'(t)/dt=|\cos\{\alpha x'(t-D)+m(t)u(t)+\varphi\}|^2 \quad (6)$$

Here, since the optical modulator is assumed to be an intensity modulator, a non-linear function of cos is given beforehand. Further, α is a constant related to PD conversion efficiency or attenuation/application on the RF line, and φ is a constant related to the bias voltage of the optical modulator. Moreover, m(t) is an 8-bit complex random number, which is uniformly generated by pseudo random numbers in the range of amplitude [0:1] and phase [0:2π]. The value of the delay length D is set by T−0.

The S/N ratio of a signal at the front stage of reception is 20 dB. The number of nodes is 20. It is assumed that in the optical RC, in each circulation, the white noise of −20 dB (input signal intensity ratio) is given. In determining the value of ωi, the training signal is transmitted as 500 symbols. The values of the real and imaginary parts of each symbol are used as the teaching signal, and determination is made according to the Tickonov regularization. The regulation term is 0.1. The BER is calculated from the value during free running after training. The values of α and φ are optimized using the bit error rate (BER) in the case of 16QAM as an objective function, in the ranges of [0:1] and [0:π] respectively, and are set as 0.2 and 0.1π, respectively. The value of α can be 1 or more because the search is feasible. However, if it greatly exceeds 1, the circuit will cause chaos oscillations. Therefore, it is desirable to perform searching in the range equal to or less than 1. Although the learning of ωi is performed for each modulation system, the above-described common values are used as the constants α and φ of the optical circuit.

FIGS. 8(a) to 8(c) illustrate, as simulation results, complex reception signal constellations of the three-types of optical modulation signals. FIGS. 8(d) and 8(e) illustrate exemplary temporal waveforms of the real (Real) and imaginary (Imag) parts of the complex reception signal in the case of 64QAM. In most temporal intervals, the estimated output signal coincides with the correct signal, and there are a few errors at some peaks. As understood from the drawings, applying the present invention can accurately perform demodulation for all the above-mentioned modulation systems, by using the same optical circuit.

Embodiment 2

Example 1 of Embodiment 2

An optical transmission and reception system of Example 1 of Embodiment 2 of the present invention will be described with reference to FIG. 9. The present embodiment provides a method for receiving and estimating, from the light intensity waveform of a single PD, multiple complex optical signals different in wavelength or polarization obtained from multiple coherent optical transmitters subjected to wavelength division multiplexing or polarization multiplexing.

Optical signals of respective channels modulated by multiple I/Q optical modulators 701-1 to M on the transmission side are combined by an optical MUX circuit 702 (e.g., AWG) and transmitted to the reception side via an optical transmission line 703.

On the reception side, a received complex time series signal $u_j(t)$ of each channel is subjected to conversion corresponding to the expression (1) via an optical RC circuit 704 and converted into a complex time series signal $x_j(t)$. However, j is a wavelength or polarization channel (ch) number. Since inputting a multiplex signal is feasible, the optical RC circuit 704 can be shared by all channels. This signal is added by a PD 705 for each channel and square-law detected. Therefore, the signal is subjected to conversion of expression (7) and becomes an electrical intensity signal.

$$x'(t)=\Sigma|x_j(t)|^2 \quad (7)$$

This electrical intensity signal is subjected to analog-to-digital conversion (ADC) at an input portion of a DSP 706, and the calculation of the expression (2) is performed by the DSP 706 for demodulation and reproduction, so as to estimate a desired complex transmission waveform y(t). In the expression (2), ωi is a complex number, and is present as many as the number of channels.

For example, various configurations described in Embodiment 1 can be applied to the optical RC circuit 704. According to the system of the present Embodiment 2, since the light differentiated for each channel passes through the same optical RC circuit 704, it is desirable to generate a different random number for each channel before combined by the optical MUX circuit 702 on the transmission side, as an input mask function mi(t). Accordingly, it is more desirable to adopt the configuration for multiplying a different random number for each channel before combined on the transmission side, among the systems described in Embodiment 1.

Figure 9:
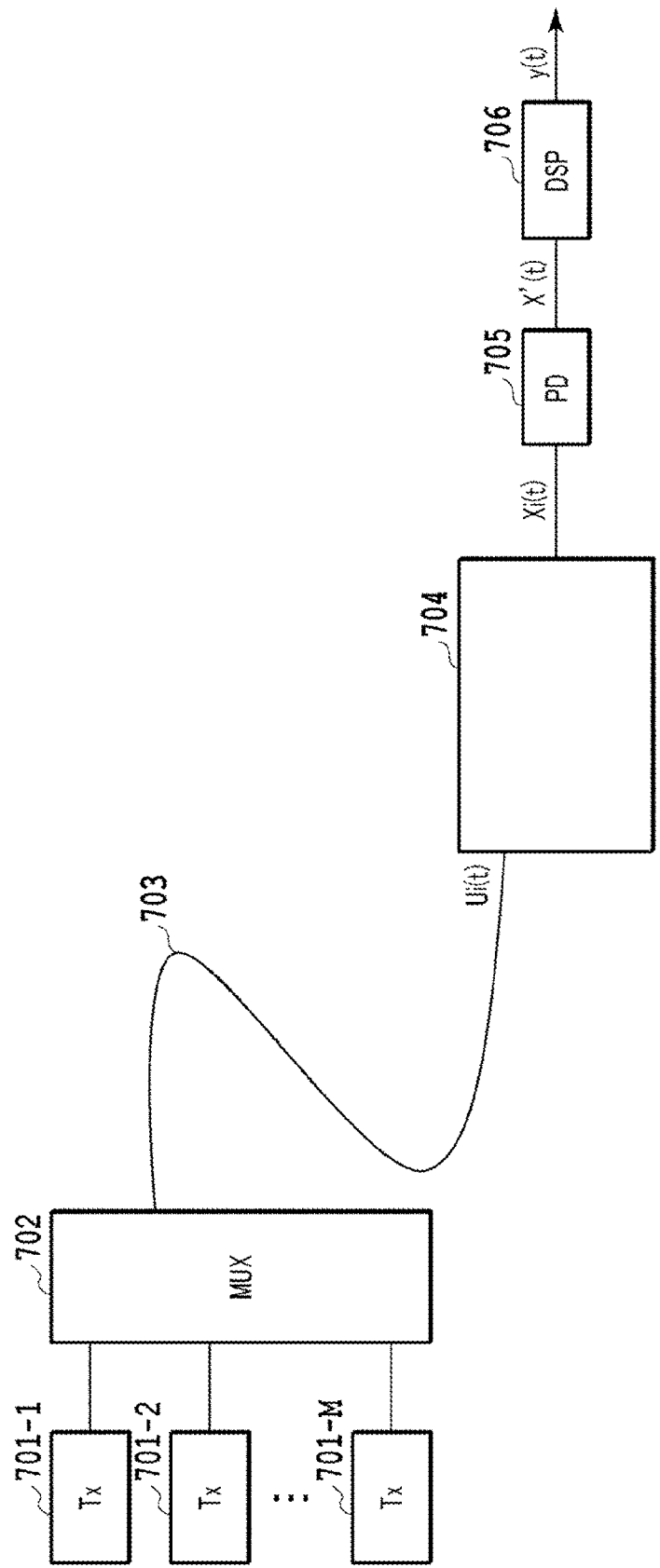
FIG. 9 is a diagram explaining an optical transmission and reception system of Example 1 of Embodiment 2 of the present invention.

In FIG. 9, descriptions of constituent elements will be omitted when they are similar to those described in Embodiment 1. Although not illustrated in the drawing, a known signal insertion unit similar to that of Embodiment 1 is provided, for each channel, in the front stage of the I/Q optical modulators (Tx) 701-1 to M on the transmission side. Therefore, a known signal (training signal) is inserted into a transmission signal at predetermined intervals. The DSP 706 on the reception side performs learning using this known signal as a teaching signal, demodulates a reception signal based on learning results, and estimates the transmission signal for each channel.

Example 2 and Example 3 of Embodiment 2

Figure 10:
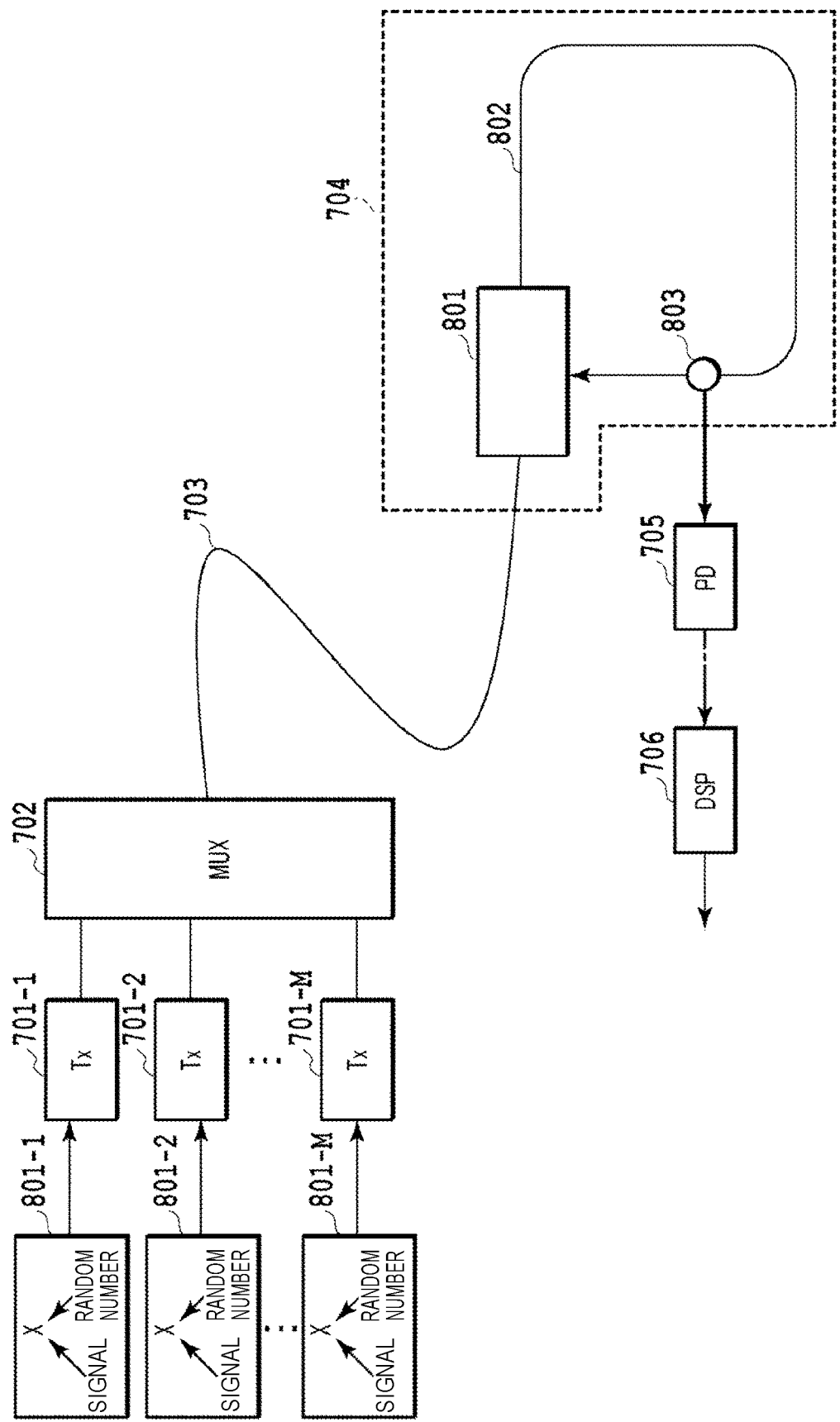
FIG. 10 is a diagram explaining an optical transmission and reception system of Example 2 of Embodiment 2 of the present invention.
Figure 11:
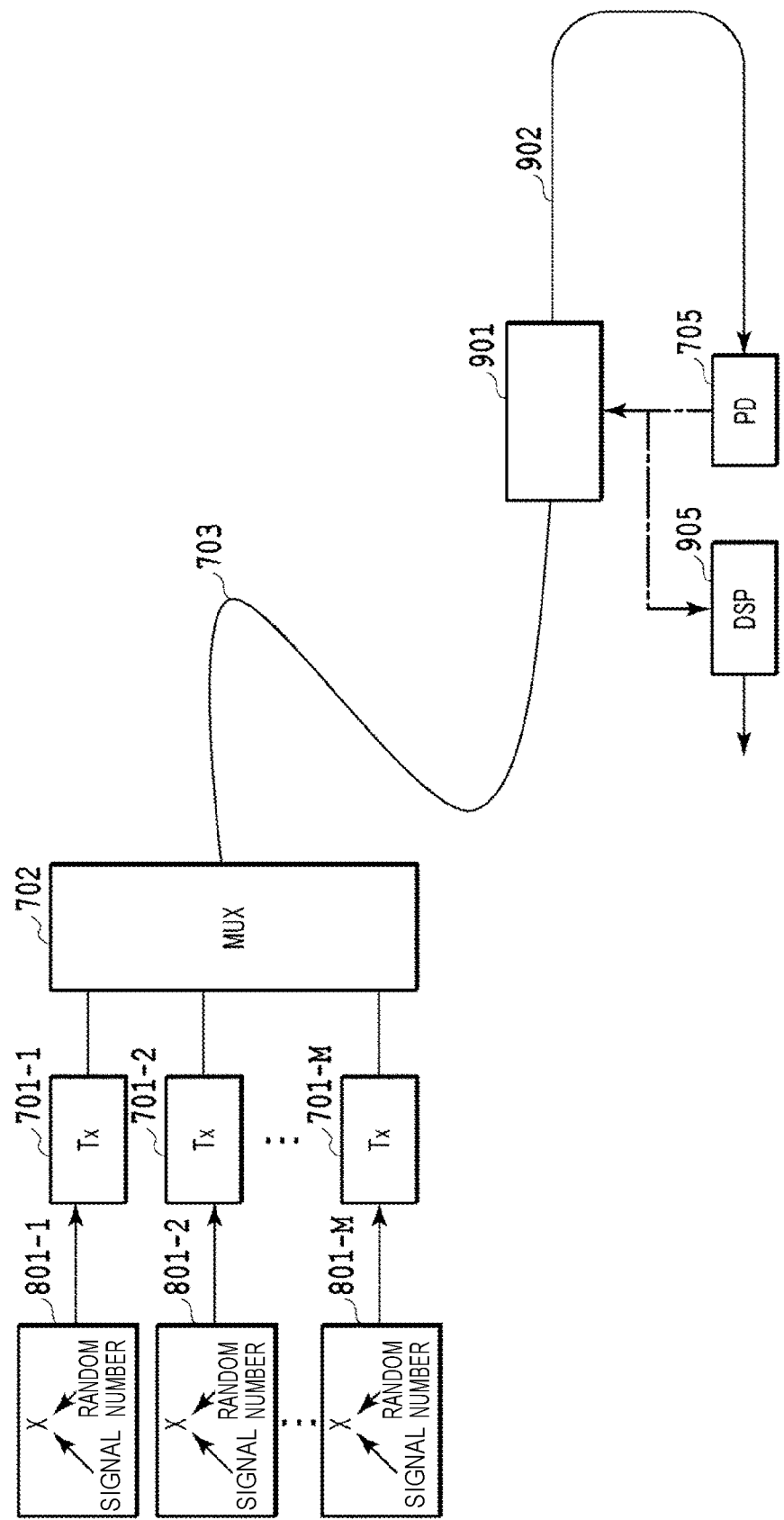
FIG. 11 is a diagram explaining an optical transmission and reception system of Example 3 of Embodiment 2 of the present invention.

FIG. 10 and FIG. 11 are schematic diagrams illustrating Example 2 and Example 3 of Embodiment 2, respectively. In each example, DSPs 801-1 to M are arranged in the front stage of I/Q optical modulators 701-1 to M on the transmission side to generate different random numbers (random signals) for respective channels and multiply them with the signals of respectively channels.

In the optical transmission and reception system of Example 2 of Embodiment 2 illustrated in FIG. 10, the configuration on the reception side includes an optical RC circuit 704 having a configuration similar to that of the optical RC circuit 203 described in Example 3 of Embodiment 1 of FIG. 6. The optical RC circuit 704 includes a delay optical ring 802 provided with a non-linear element 801 and an optical coupler 803.

Further, in the optical transmission and reception system of Example 3 of Embodiment 2 illustrated in FIG. 11, an optical RC circuit having a configuration similar to that of Example 4 of Embodiment 1 illustrated in FIG. 7 is provided. A delay optical ring 902 is provided with the PD 705 and an optical modulator 901 to which an output of the PD 705 is input. The operation principle is the same as that of Embodiment 1. Descriptions of constituent elements will be omitted when they are similar to those described in the examples 1 of Embodiment 1 and Embodiment 2.

(Simulation Results of Embodiment 2)

FIG. 12 illustrates, as an example of learning, simulation results obtained when three-wavelength WDM16QAM optical modulation signals are subjected to complex reception estimation according to the method proposed in Embodiment 2. Calculation of the simulation is performed in the baseband width, assuming that respective wavelengths are sufficiently separated. Influences of band constriction and group delay in the transmission path caused by the optical filter is ignored. For the optical RC circuit, the configuration illustrated in FIG. 11 in which the PD 705 and the light intensity modulator 901 are used as the non-linear element is taken into consideration. The evolution equation of the optical signal in the delay optical ring 902 at this time is calculated by the above-mentioned expression (6).

Here, since the optical modulator is assumed to be an intensity modulator, a non-linear function of cos is given. Further, α is a constant related to PD conversion efficiency or attenuation/application on the RF line, and φ is a constant related to the bias voltage of the optical modulator. Moreover, $m_j(t)$ is an 8-bit complex random number, which is uniformly generated by pseudo random numbers in the range of amplitude [0:1] and phase [0:2π]. The value of the delay length D is set by T–0. The S/N ratio of a signal at the front stage of reception is 30 dB. The number of nodes is 40. It is assumed that in the optical RC, in each circulation, the white noise of –30 dB (input signal intensity ratio) is given. In determining the value of ωi, the training signal is transmitted as 1000 symbols. The values of the real and imaginary parts of each symbol are used as the teaching signal, and determination is made according to the Tickonov regularization. The regulation term is 0.1. The BER is calculated from the value during free running after training. The values of α and φ are optimized using the bit error rate (BER) in the case of 16QAM as an objective function, in the ranges of [0:1] and [0:π], respectively, and are set as 0.1 and 0.1π, respectively. The value of a can be 1 or more because the search feasible. However, if it greatly exceeds 1, the circuit will cause chaos oscillations. Therefore, it is desirable to perform searching in the range equal to or less than 1.

Figures 12A, 12B, 12C:
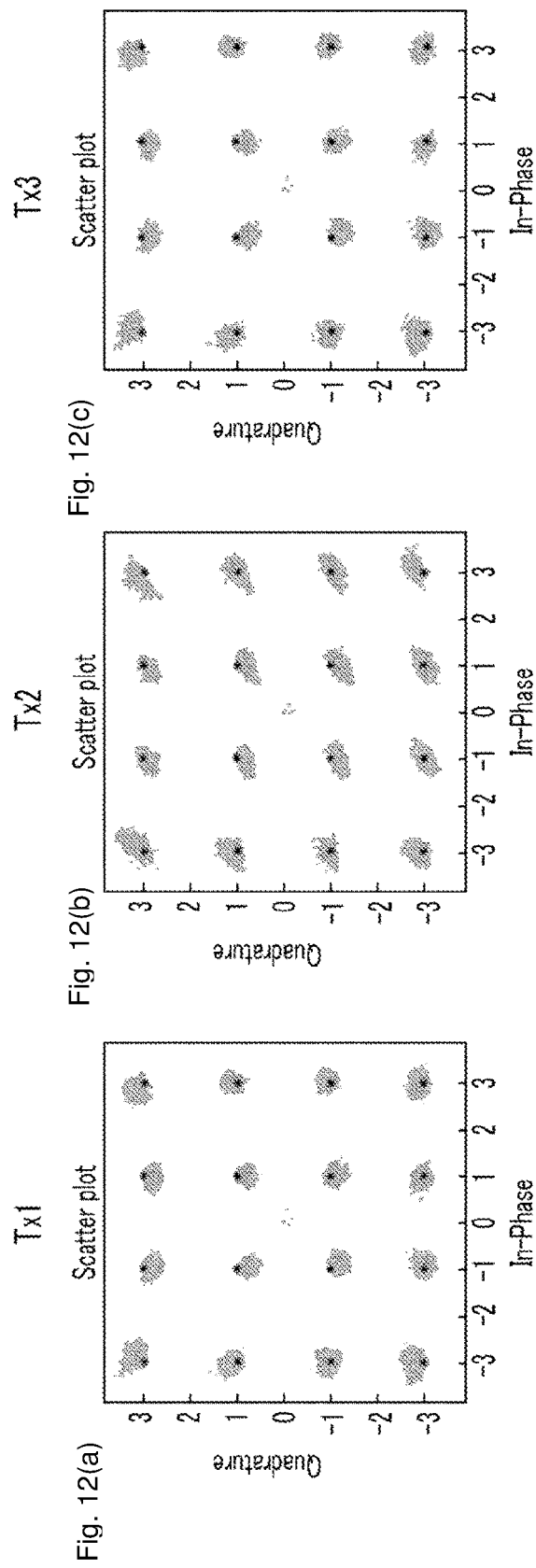
FIG. 12 is a diagram illustrating simulation results of multiple wavelength coherent demodulation in Embodiment 2 of the present invention.
Figures 12D, 12E:
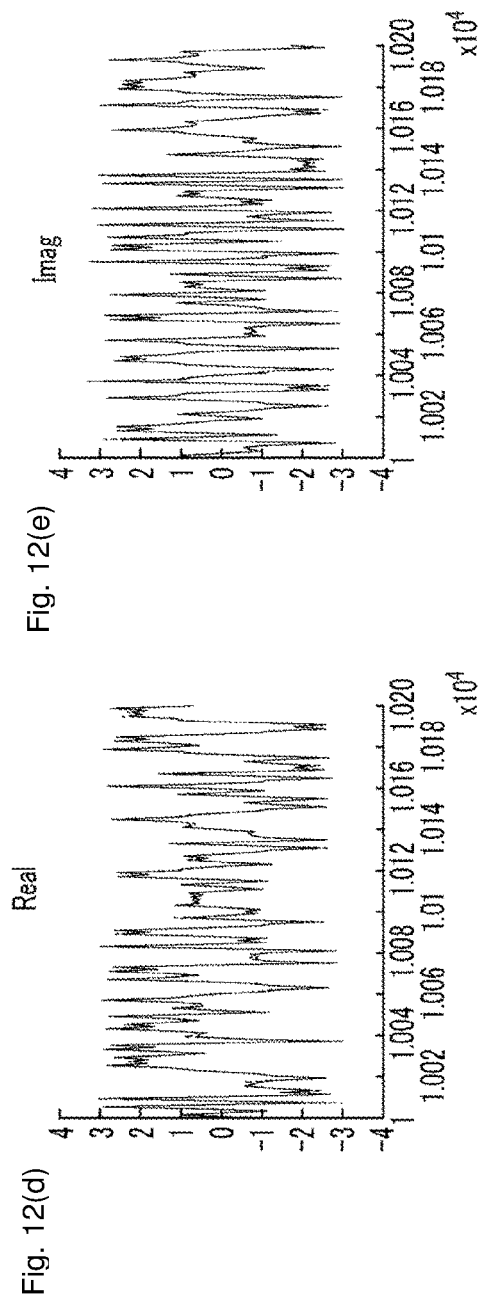

FIGS. 12(a) to 12(c) illustrate, as simulation results, complex reception signal constellations of each wavelength ch corresponding to Tx1 to Tx3. FIGS. 12(d) and 12(e) illustrate exemplary temporal waveforms of the real and imaginary parts of ch2 (Tx2). In most temporal intervals, the estimated output signal coincides with the correct signal, and there are a few errors at some peaks. As understood from the drawings, applying the present invention can accurately demodulate optical complex signals of a plurality of wavelengths by using a single light intensity receiver.

INDUSTRIAL APPLICABILITY

As described above, the present invention realizes an optical transmission and reception system using an optical RC circuit to reproduce an optical complex signal from a reception light intensity waveform of optical coherent communication. In particular, the present invention can realize an optical transmission and reception system that uses direct photodetection by a single PD and an optical RC circuit to reproduce optical signals in a complex space transmitted from multiple optical transmitters from the intensity waveform of a reception optical signal of the single PD.

REFERENCE SIGNS LIST 101-1 to N, 201, 701-1 to M I/Q optical modulator (Tx)
102, 702 optical MUX circuit
103, 202, 210, 703 optical transmission line
104 optical DEMUX circuit
105, 105-1 to N coherent optical receiver (Rx)
106-1 to N, 401, 706, 801-1 to M digital signal processing device (DSP)
107 input optical signal
108, 211 laser beam, laser source
109 90° hybrid light interference system
110, 204, 504, 705 photoelectric conversion element (PD)
10 RC circuit (reservoir computing circuit)
11 input layer
12 intermediate layer (reservoir layer)
13 output layer
203, 704 optical RC circuit
212, 301, 501, 901 optical modulator
213 optical FIR filter unit
214, 218, 305, 803 optical coupler
215, 304 optical circulating portion, delay optical ring (optical loop, optical delay line)
216 variable attenuator
217, 303, 801 non-linear element (NL)
219 optical receiver
220 electric signal processing circuit
209 known signal insertion unit
302 arbitrary waveform generator

The invention claimed is:

1. An optical transmission and reception system comprising:
   an optical transmitter including
   a known signal insertion unit that inserts a known signal into a transmission signal at predetermined intervals, and
   an optical modulator that optically modulates the transmission signal into which the known signal has been inserted and transmits an optical modulation signal to an optical transmission line; and
   an optical receiver including
   an optical RC circuit that converts the optical modulation signal received from the optical transmission line into a complex time series signal,
   photoelectric conversion element that converts the complex time series signal into an electrical intensity signal, and
   a digital signal processing unit that performs learning using the known signal as a teaching signal and performs demodulation, based on learning results, using the electrical intensity signal received from the photoelectric conversion element.

2. The optical transmission and reception system according to claim 1, wherein
   the optical transmitter or the optical receiver is provided with a random signal generation unit that adds a random signal at a period equal to or higher than a bit rate of the transmission signal,
   the optical RC circuit includes a non-linear conversion unit and a delay line connected to the non-linear conversion unit, and
   the non-linear conversion unit performs non-linear conversion using a signal on which the random signal is superposed and a signal received from the delay line and optically outputs the complex time series signal.

3. The optical transmission and reception system according to claim 1, wherein the optical modulation signal is an optical modulation signal obtained by, prior to output, combining optical signals with different wavelengths or polarizations output from one or more transmitters for each channel in an optical MUX circuit.

4. The optical transmission and reception system according to claim 1, wherein the optical RC circuit includes
a delay optical ring provided with a non-linear element and an optical coupler, and
an optical modulator provided in a front stage of the delay optical ring to modulate an input optical signal received from the optical transmission line by a random signal generated by an arbitrary waveform generator and output the modulated optical signal to the non-linear element, and
the complex time series signal is branched and output from the optical coupler to the photoelectric conversion element.

5. The optical transmission and reception system according to claim 1, wherein
the optical modulator of the optical transmitter generates the optical modulation signal by an output of the digital signal processing unit that multiplies the transmission signal by a random signal,
the optical RC circuit includes a delay optical ring provided with a non-linear element and an optical coupler,
an input optical signal received from the optical transmission line is input to the non-linear element, and
the complex time series signal is branched and output from the optical coupler to the photoelectric conversion element.

6. The optical transmission and reception system according to claim 1, wherein
the optical RC circuit includes a delay optical ring provided with a photoelectric conversion element and an optical modulator to which an electric output of the photoelectric conversion element is input,
the electric output of the photoelectric conversion element is electrically branched and output to the digital signal processing unit, and
a random signal from an arbitrary waveform generation device is input to the optical modulator provided in the delay optical ring.

7. The optical transmission and reception system according to claim 2, wherein the optical modulation signal is an optical modulation signal obtained by, prior to output, combining optical signals with different wavelengths or polarizations output from one or more transmitters for each channel in an optical MUX circuit.

* * * * *